United States Patent
Hong et al.

(10) Patent No.: US 11,492,427 B2
(45) Date of Patent: Nov. 8, 2022

(54) PRODUCTION OF GRADIENT COPOLYMERS USING MONOMER AND COMONOMER CONCENTRATION GRADIENTS IN A LOOP REACTOR

(71) Applicant: ExxonMobil Chemical Patents Inc., Baytown, TX (US)

(72) Inventors: Yifeng Hong, Houston, TX (US); Shanshan Zhang, Houston, TX (US); Jay L. Reimers, Houston, TX (US)

(73) Assignee: EXXONMOBILE CHEMICALS PATENTS INC., Baytown, TX (US)

( * ) Notice: Subject to any disclaimer, the term of this patent is extended or adjusted under 35 U.S.C. 154(b) by 0 days.

(21) Appl. No.: 17/064,109

(22) Filed: Oct. 6, 2020

(65) Prior Publication Data
US 2021/0122855 A1 Apr. 29, 2021

Related U.S. Application Data (60) Provisional application No. 62/927,201, filed on Oct. 29, 2019.

(51) Int. Cl.
*C08F 210/06* (2006.01)
*C08F 210/02* (2006.01)

(52) U.S. Cl.
CPC .......... *C08F 210/06* (2013.01); *C08F 210/02* (2013.01)

(58) Field of Classification Search
CPC ...... C08F 2/14; C08F 2/06; C08F 2/01; C08F 210/06; C08F 210/02; C08F 4/6592; C08F 2500/06
USPC .......................................................... 526/64
See application file for complete search history.

(56) References Cited

U.S. PATENT DOCUMENTS

| | | | |
|---|---|---|---|
| 8,410,230 B2* | 4/2013 | Kiss ..................... | B01J 19/0013 526/87 |
| 2001/0025088 A1* | 9/2001 | Marissal ................. | C08F 10/02 526/348.5 |
| 2010/0292407 A1* | 11/2010 | Jacobsen ............... | C08F 210/16 525/240 |
| 2011/0196115 A1* | 8/2011 | Kiss ..................... | B01J 19/1837 526/89 |
| 2011/0196116 A1 | 8/2011 | Kiss et al. | |
| 2018/0265407 A1* | 9/2018 | Weidmann .......... | C04B 24/2658 |
| 2018/0327518 A1 | 11/2018 | Alastalo et al. | |

OTHER PUBLICATIONS

Matyjaszewski et al (J. Phys. Org. Chem. 2000; 13: 775-786) (Year: 2000).*
Choi et al., Kinetic Modeling of Ethylene-Norbornene Copolymerization Using Homogeneous Metallocene Catalysts, Macromolecules, (2003) 36, 4216-4225.

(Continued)

*Primary Examiner* — Robert S Jones, Jr.
*Assistant Examiner* — Jiangtian Xu
(74) *Attorney, Agent, or Firm* — Katherine L. Jackson (57) ABSTRACT

A method for producing gradient copolymers can include polymerizing a reaction mixture comprising a monomer and a comonomer in the presence of a metallocene catalyst in a loop reactor, wherein in the loop reactor a gradient monomer weight percent in the reaction mixture is about 3 wt % to about 50 wt %, thereby forming a gradient copolymer.

19 Claims, 1 Drawing Sheet

(56) References Cited

OTHER PUBLICATIONS

Karssenberg et al., Terminal and Penultimate Reactivity Ratios in Single-Site Ethene/Propene Copolymerizations: Comparison of Kakugo and Direct Peak Methods, Macromolecular Chemistry and Physics (2005) 206, 1675-1683.
Chakravarti et al., Kinetic Study of Olefin Polymerization with a Supported Metallocene Catalyst. II. Ethylene/1-Hexene Copolymerization in Gas Phase, Journal of Applied Polymer Science (2001) vol. 80, 1096-1119.

* cited by examiner

_PRODUCTION OF GRADIENT COPOLYMERS USING MONOMER AND COMONOMER CONCENTRATION GRADIENTS IN A LOOP REACTOR_

CROSS-REFERENCE TO RELATED APPLICATIONS

This application claims the priority benefit of U.S. Ser. No. 62/927,201, filed Oct. 29, 2019, the disclosure of which is incorporated herein by reference.

FIELD

The present disclosure relates to producing gradient copolymers.

BACKGROUND

Solution polymerization and slurry polymerization are two major processes by which polymerization can be performed at an industrial scale. Solution polymerization involves dissolution of polymers in solvents while slurry polymerization involves suspension of the polymers in solvents. In the solution polymerization process, monomer, comonomer, catalyst/activator, and polymers are dissolved in a solvent, typically a nonreactive solvent. The monomer and comonomer are polymerized at elevated temperatures in reactors. The heat released by the reaction is absorbed by the solvent and removed by various methods including, but not limited to, chilling the feed solvent, reflux cooling, jacketed cooling, and external heat exchangers. The solvent and unreacted monomers are flashed off from the polymers in the concentration and devolatilization stages after the reaction. The resulting molten polymers are then extruded and pelletized in water to form small pellets, which are dried and bagged sequentially. Slurry polymerization has similar steps with the major difference being that the polymers are suspended in the solvent and solvent can be reactive.

Continuous stirred-tank reactor (CSTR) and loop reactors are used in both solution and slurry polymerization processes. While CSTR solution or slurry polymerization processes beneficially mix the reactants and catalyst well, the processes struggle to accommodate very high heat of polymerization because of inefficient heat removal from the reactor. Specifically, reflux cooling, cooling jacket, or chilled feed for polymerization in a CSTR provide limited capability of heat removal, which results in higher reaction temperatures. Currently, metallocene catalysts are widely used in producing polyolefins because of their higher catalyst activity as compared to conventional Ziegler-Natta catalysts. However, metallocene catalysts generally require lower reaction temperatures than the Ziegler catalysts. Therefore, a dilute polymer concentrations or reduced conversion is usually needed if a CSTR is used in solution or slurry polymerization processes.

Using a loop reactor can overcome the limitations of the CSTR in solution and slurry polymerization processes. Generally, loop reactors are made of several heat exchangers in a loop. As such, loop reactors can take away massive heat released by the polymerization reactions, which enables high polymer concentration and high monomer conversion. Moreover, with feed chilling, the temperature of reaction can be controlled at considerably lower temperatures than that in CSTR process, meeting the requirement of metallocene catalysts.

A block copolymer is a polymer comprising multiple sequences, or blocks, of the same monomer alternating in series with different monomer blocks. A block may be defined as a portion of the block copolymer molecule, in which the monomeric units have at least one constitutional or configurational feature absent from the adjacent portion. The blocks may be covalently bound to each other such as AB, ABA, BAB, BABA, and the like, where A and B are different blocks. Block copolymers are classified based on the number of blocks they contain and how the blocks are arranged. For example, block copolymers with two blocks and three blocks are called diblock and triblock copolymers, respectively. Classifications by arrangement include the linear, or end-to-end, arrangement and the star arrangement, in which one polymer is the base for multiple branches. The importance of block copolymers derives from their unique and useful properties in solution and in the solid state. These properties result from the combination of different polymers in alternating sequences, which may produce a thermodynamic incompatibility between the blocks, or micro-phase separation. For example, the properties of thermoplastic elastomers, which are a class of block copolymers, are directly derived from the composition-dependent morphology of these polymers. Thermoplastic elastomers are thus a desirable alternative to thermoset materials due to their physical cross-links, which could provide similar deformation resistance while maintaining the recycle ability. The elasticity of thermoplastic elastomers is derived from the microstructure containing alternating hard segments with wither high melting point (Tm) or high glass transition temperature (Tg) and soft segments with low Tg. The hard segment allows elastic recovery, while the soft segment elongates upon strain-induced deformation. Typically, at least two hard segments and one soft segment are needed for achieving good elastic behavior. Thus ABA triblock or (AB)n multiblock copolymer architectures are generally targeted to synthesize.

Besides the well-defined block copolymers, another class of less studied copolymers includes the "gradient copolymers," also known as tapered copolymers, whose composition (e.g., relative concentrations of A and B monomers) varies gradually along the copolymer chain and can be described by a distribution function.

The resulting molecular disorder along the gradient copolymer chain is thought to be responsible for outstanding properties including unique thermal properties, uncommon mechanical behavior, and unique abilities as surfactants or as modifiers for blending incompatible materials, each of which are difficult to achieve in model sequential block copolymers. Also, gradient copolymers are less prone to microphase separation than analogous AB diblocks. Although gradient copolymers have very appealing properties, there appear to be no processes available for industrial scale production.

SUMMARY OF THE INVENTION

The present disclosure relates to producing gradient copolymers.

A nonlimiting example embodiment of the present disclosure is a method comprising polymerizing a reaction mixture comprising a monomer and a comonomer in the presence of a metallocene catalyst in a loop reactor, wherein in the loop reactor a gradient monomer weight percent in the reaction mixture is about 3 wt % to about 50 wt %, thereby forming a gradient copolymer. The method may further include injecting a first feed into the loop reactor at a feed injection point; and injecting a second feed into the loop reactor via an injection port that is downstream of the feed injection point, wherein the first feed and second feed have different weight ratios of monomer to comonomer.

A gradient polymer produced by such methods and other methods described herein may have one or more of the following properties: (a) a number average molecular weight of about 25,000 g/mol to about 100,000 g/mol, (b) a gradient monomer weight percent of about 3 wt % to about 30 wt %, (c) a gradient comonomer weight percent for individual comonomers of about 3 wt % to about 30 wt %, (d) segments with a monomer content of about 50 wt % to about 100 wt %, and (e) segments with a comonomer content for individual comonomers of 0 wt % to about 50 wt %.

BRIEF DESCRIPTION OF THE DRAWINGS

The following FIGURE is included to illustrate certain aspects of the embodiments, and should not be viewed as an exclusive embodiment. The subject matter disclosed is capable of considerable modifications, alterations, combinations, and equivalents in form and function, as will occur to those skilled in the art and having the benefit of this disclosure.

DETAILED DESCRIPTION

Figure 1:
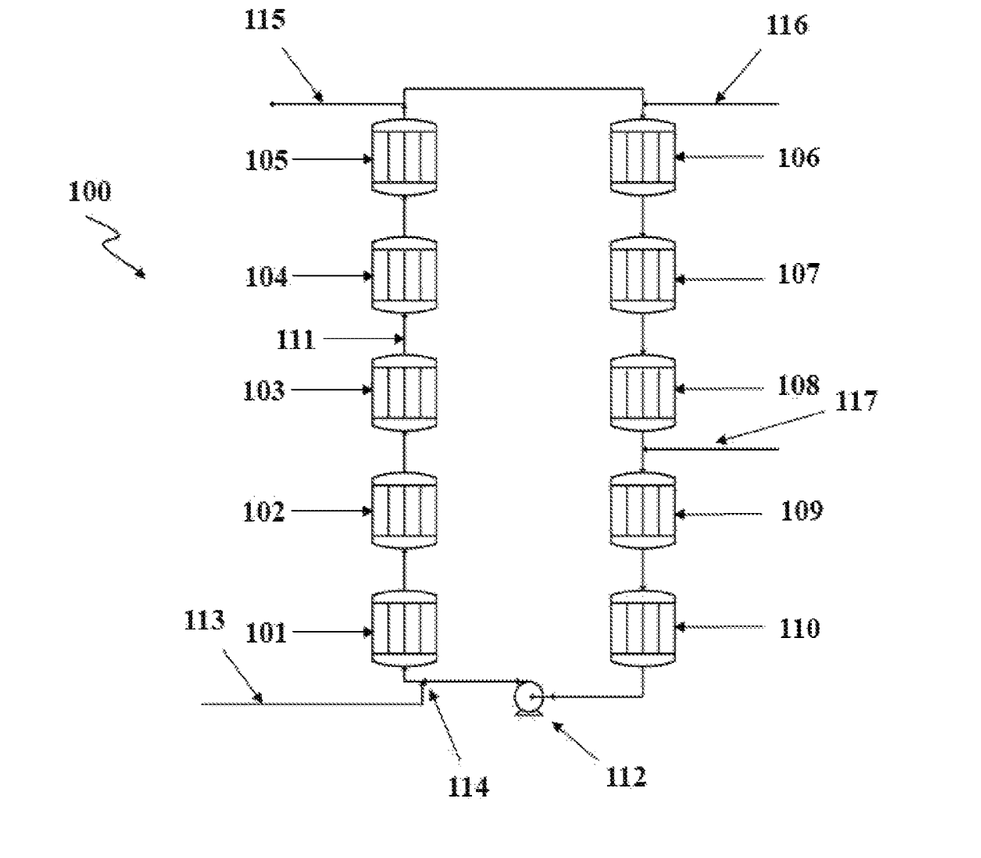
The FIGURE illustrates a diagram of a process flow for the production of gradient copolymers in a loop reactor.

The present disclosure relates to methods for producing gradient copolymers in a loop reactor by creating a monomer and/or comonomer concentration gradient along the loop.

Definitions

As used herein, a "copolymer" refers to a polymer formed by the polymerization of at least two different monomers or of at least one monomer and one comonomer. For example, the term "copolymer" includes the copolymerization reaction product of propylene and an alpha-olefin, such as ethylene. However, the term "copolymer" is also inclusive of, for example, the product of copolymerization of a mixture of propylene, ethylene, 1-hexene, and 1-octene. In another example, a copolymer includes monomer units derived from propylene, ethylene, and butene.

The term "monomer" or "comonomer," as used herein, can refer to the monomer or comonomer used to form the copolymer (i.e., the unreacted chemical compound in the form prior to polymerization) and can also refer to the monomer or comonomer after it has been incorporated into the copolymer.

When a polymer or a portion (or segment) of a polymer, such as a polymer end, is referred to as comprising a monomer (or comonomer), the monomer (or comonomer) is present in the polymer or portion of the polymer in the polymerized form of the monomer (or comonomer) or in the derivative form of the monomer (or comonomer). Thus, when a polymer or polymer portion is said to comprise a certain monomer (or comonomer) content, that monomer (or comonomer) content is based on the total amount of monomer (or comonomer) units in the polymer or polymer portion. That is, a polymer comprising an ethylene content of 30 wt % and a propylene content of 70 wt % is a polymer where 30 wt % of the polymer is ethylene-derived units and 70 wt % of the polymer is propylene-derived units. In another example, a polymer portion comprising a propylene content of 75 wt % and an ethylene content of 25 wt % refers to a polymer portion where 75 wt % of the polymer portion is propylene-derived units and 25 wt % of the polymer portion is ethylene-derived units. In yet another example, a polymer comprising a first polymer end having a propylene content of 80 wt % and an ethylene content of 20 wt % and a second polymer end having a propylene content of 5 wt % and an ethylene content of 95 wt % refers to a polymer comprising a first polymer end having 80 wt % propylene-derived units and 20 wt % ethylene-derived units and a second polymer end having 5 wt % propylene-derived units and 95 wt % ethylene-derived units.

As used herein, a "catalyst system" is the combination of at least one catalyst compound, at least one activator, and an optional co-activator.

Loop Reactor

Loop reactors generally have 2 or more (e.g., 2 to 50, or 2 to 25, or 5 to 15) heat exchangers. Generally, the methods of the present disclosure preferably have a higher number of heat exchangers (e.g., 5 to 15) to provide finer control of the composition of the produced gradient copolymers.

The FIGURE illustrates a diagram of a loop reactor 100 including ten heat exchangers 101-110 connected with pipes 111 in a loop. A recycle pump 112 is also placed in the loop to drive the process fluid moving around the loop. The feed 113 contains catalyst/activator, solvent, and monomer/comonomer with pre-designed ratios and is injected via a feed injection point 114 into the loop reactor. It is not restricted where to put the feed injection point 114 but, to maintain the simplicity, in the FIGURE, it is placed at the bottom of the loop. Further, more than one injection point may be included for introducing the catalyst/activator, the solvent, and/or the monomer/comonomer individually or in combination.

The reactor outlet 115 is preferably located at the far end from the feed injection point 114. Two monomer or comonomer injection ports 116 and 117 are placed after the reactor outlet in this example loop reactor 100. The injection ports 116 and 117 can be relocated at different locations within the loop reactor 100. In the method described herein, the arrangement of the injection ports allows their separation distance to maximize the gradient. The recycle ratio, which is defined as the mass rate of polymer solution recycled back over the mass rate of polymer solution sent out to the next stage, represents the number of loops the polymer travels before leaving the loop reactor. In the method described herein, the recycle ratio is from 0.01 to 100.

As described further herein, several parameters can be used to control the comonomer gradient in the produced gradient copolymer. A first parameter is the comonomer or monomer rate in the first injection port 116, the second injection port 117, and/or any other injection port included in a loop reactor.

A second parameter of the loop reactor that may be used to control the comonomer gradient in the produced gradient copolymer is the "recycle ratio." The recycle ratio is defined as the quotient of the amount of material that flows back to the loop over the amount of material that leaves the loop. For example, a recycle ratio of 3 means that 25 wt % of the material exits the loop reactor at the reactor outlet 115 and 75 wt % of the material recycles through the loop reactor 100 (i.e., 75 wt % divided by 25 wt % gives a recycle ratio of 3).

Each of these parameters may be used separately or in any combination. For example, injecting an additional amount of comonomer in one or both injection ports 116 and 117 creates a concentration gradient for the relative amounts of monomer to comonomer in the second half of the loop, thus providing in a gradient of incorporated monomer and comonomer in the resulting gradient copolymer.

Polymerization Process and Gradient Polymer Product

The methods of the present disclosure can include forming a polyolefin product by polymerizing a monomer and a comonomer in the presence of a catalyst system in a loop reactor.

The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous.

For example, the polymerization process may be a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between about 15 psig to about 735 psig (103 kPa to 5068 kPa) or even greater and temperatures in the range of 0° C. to about 120° C. In a slurry polymerization, a suspension of solid, particulate polyolefin is formed in a liquid polymerization diluent medium to which monomer and comonomers along with catalyst are added. The liquid diluent employed in the polymerization medium is typically an alkane having from 3 to 7 carbon atoms, preferably a branched alkane. The medium employed should be liquid under the conditions of polymerization and relatively inert. Examples of diluents include, but are not limited to, one methane, ethane, propane, butane, isobutane, isopentane, hexanes, heptanes, and any combination thereof. When a propane medium is used the process must be operated above the reaction diluent critical temperature and pressure. Preferably, a hexane or an isobutane medium is employed.

Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated C4-10 alkanes, chlorobenzene, and aromatic and alkyl substituted aromatic compounds, such as benzene, toluene, mesitylene, and xylene. Suitable solvents also include liquid olefins that can be polymerized including ethylene, propylene, 1-butene, 1-hexene, 1-pentene, 3-methyl-1-pentene, 4-methyl-1-pentene, 1-octene, 1-decene, and mixtures thereof. In a preferred example, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another example, the solvent is not aromatic, preferably aromatics are present in the solvent at less than 1 wt %, preferably less than 0.5 wt %, preferably 0 wt % based upon the weight of the solvents.

In a preferred example, the feed concentration of solvent or diluent is 60 vol % or less, preferably 40 vol % or less, or preferably 20 vol % or less, based on the total volume of the feed.

In another example where the polymerization process is a solution polymerization, the process may comprise polymerizing one or more monomers and one or more comonomers dissolved in a solvent as described herein in the presence of a catalyst system under conditions to obtain an effluent comprising a solution of polyolefin and solvent and/or unreacted monomer and/or unreacted comonomer.

The solution polymerization processes in the reactor may be conducted under reactor polymerization conditions including a temperature of about 50° C. to about 250° C., preferably about 60° C. to about 230° C., preferably about 70° C. to about 200° C., preferably about 80° C. to about 170° C., preferably about 90° C. to about 120° C. The polymerization process may be conducted at a pressure of about 120 psig to about 1800 psig (about 827 kPa to about 12,411 kPa), preferably about 200 psig to about 1000 psig (about 1379 kPa to about 6895 kPa), preferably about 300 psig to about 600 psig (about 2068 kPa to about 4137 kPa). Preferably, the pressure is about 450 psig (about 3103 kPa).

The feed at the feed injection point may comprise monomer and be absent comonomer where comonomer is added downstream at an injection port. The feed at the feed injection point may comprise comonomer and be absent monomer where monomer is added downstream at an injection port. The feed at the feed injection point may comprise monomer and comonomer where monomer and/or comonomer are added downstream at an injection port. The weight ratio of monomer to comonomer in a feed at the feed injection point can be 0:1 (i.e., absent monomer) to 1:0 (i.e., absent comonomer), or 1:0 to about 10:1, or about 1:1 to about 100:1, or about 2:1 to about 75:1, or about 5:1 to about 60:1. Where two or more comonomers are used, the weight ratio of monomer to any additional comonomer individually in a feed can be 0:1 (i.e., absent monomer) to 1:0 (i.e., absent additional comonomer), or 1:0 to about 10:1, or about 1:1 to about 100:1, or about 2:1 to about 75:1, or about 5:1 to about 60:1.

Hydrogen may be present during the slurry and solution polymerization processes in the reactor at a partial pressure of about 0.001 psig to about 50 psig (about 0.007 kPa to about 345 kPa), preferably about 0.01 psig to about 25 psig (about 0.07 kPa to about 172 kPa), preferably about 0.1 psig to about 10 psig (about 0.7 kPa to about 70 kPa).

The gradient monomer weight percent in the reaction mixture can be controlled or otherwise adjusted by controlling or otherwise adjusting (a) the amount of monomer and/or comonomer in an injection feed and/or (b) the recycle ratio. As used herein, the "gradient monomer weight percent in the reaction mixture" in the loop reactor refers the difference between the highest and lowest wt % concentration of monomer relative to total monomer and comonomer weight in the reaction mixture. For example, if the monomer is present at its highest at 75 wt % of the total monomer and comonomer weight in the reaction mixture in a first location of the loop reactor and at its lowest at 10 wt % of the total monomer and comonomer weight in the reaction mixture in a second location of the loop reactor, the gradient monomer weight percent is 65 wt %. Similarly, as used herein, the "gradient comonomer weight percent in the reaction mixture" in the loop reactor refers the difference between the highest and lowest wt % concentration of comonomer relative to total monomer and comonomer weight in the reaction mixture. Similarly, when two or more comonomers are used, as used herein, the "gradient comonomer weight percent in the reaction mixture" for a specific comonomer in the loop reactor refers the difference between the highest and lowest wt % concentration of the specific comonomer relative to total monomer and comonomers weight in the reaction mixture.

By controlling or otherwise adjusting said parameters, the gradient monomer weight percent can be adjusted from about 3 wt % to about 50 wt %, or about 5 wt % to about 40 wt %, or about 5 wt % to about 25 wt %, or about 10 wt % to about 30 wt %. Further, the gradient comonomer weight percent for each individual comonomer can be adjusted from about 3 wt % to about 50 wt %, or about 5 wt % to about 40 wt %, or about 5 wt % to about 25 wt %, or about 10 wt % to about 30 wt %.

The gradient monomer weight percent in the reaction mixture, the gradient comonomer weight percent in the reaction mixture, and, consequently, the composition of a gradient copolymer may be controlled by maintaining continuous growth of the polymer chain while regulating or changing the weight ratio of monomer to comonomer at various locations along the loop reactor, thus creating monomer and comonomer concentration gradients. In the polymerization, the monomer and comonomer may have different reactivities resulting in different rates of incorporation within the copolymer chain and, consequently, different concentrations of monomer and comonomer in the reaction mixture. The incorporation of the most reactive component to a greater extent at the beginning of the polymerization followed by the gradually increasing the incorporation of the less reactive component as the polymerization proceeds results in a gradient copolymer composition.

The gradient monomer weight percent in the reaction mixture, the gradient comonomer weight percent in the reaction mixture, and, consequently, the composition of a gradient copolymer can be further controlled or adjusted by altering the concentration of the monomer or the comonomer in the reaction mixture by adding monomer and/or comonomer via the injection port(s), and thus creating monomer and comonomer concentration gradients while the copolymer is growing. For example, the monomer and comonomer may be initially present in weight ratio of monomer to comonomer in the reaction mixture of x:y (e.g., 0:1 (i.e., absent monomer) to 1:0 (i.e., absent comonomer), or about 1:1 to about 100:1, or about 2:1 to about 75:1, or about 5:1 to about 60:1). The addition of an amount of monomer and/or comonomer to the reaction mixture changes said weight ratio to x':y' (e.g., 0:1 (i.e., absent monomer) to 1:0 (i.e., absent comonomer), or about 1:1 to about 100:1, or about 2:1 to about 75:1, or about 5:1 to about 60:1 where x:y does not equal x':y'). The addition of an amount of monomer and/or comonomer can be repeated as often as desired to vary the weight ratio of monomer to comonomer present in the reaction mixture at different points along the loop reactor. For example, the comonomer may be gradually increased (y'>y normalized such that x=x') resulting in a gradient copolymer having a gradual increase of comonomer content as the copolymer chain grows. In another example, the percentage of monomer may be gradually increased (x'>x normalized such that y=y') resulting in a gradient copolymer having a gradual increase of monomer content as the copolymer chain grows.

The monomer and/or comonomer may be added in an injection feed via one or more injection ports within the loop reactor at a weight ratio of monomer to comonomer of 0:1 (i.e., absent monomer) to 1:0 (i.e., absent comonomer), or about 1:1 to about 100:1, or about 2:1 to about 75:1, or about 5:1 to about 60:1).

Additional to or in alternative of using an injection feed to vary the weight ratio of monomer to comonomer in the reaction mixture, varying the recycle ratio may be used to adjust the weight ratio of monomer to comonomer in the reaction mixture, the gradient monomer weight percent in the reaction mixture, the gradient comonomer weight percent in the reaction mixture, and, consequently, the composition of a gradient copolymer. With a constant feed rate, a high recycle ratio represents a high portion of reactant coming back and mixed with fresh feed. Consequently, the active polymerization site of the growing polymer has a short residence time for each of the heat exchangers, which results in a smaller gradient monomer weight percent in the reaction mixture and a smaller gradient comonomer weight percent in the reaction mixture. Conversely, with all other variables constant, a lower recycle ratio increases the active site residence time in the heat exchangers and can be used to produce a polyolefin product with a greater gradient monomer weight percent in the reaction mixture and a greater gradient comonomer weight percent in the reaction mixture.

The recycle ratio can vary from 0.01 to 100, or 0.02 to 50, or 0.03 to 10, or 0.05 to 8.

The copolymerization may be sampled at the exit of each of the heat exchangers present within the loop reactor, and the monomer and comonomer contents in the corresponding copolymer portions or segments may be determined in accordance with known methods. With each copolymer portion, the content of the comonomer decreases as the content of the monomer increases (or vice versa) during the course of the copolymerization resulting in a gradient copolymer.

The composition of the gradient copolymer may also be controlled to provide varying lengths of copolymer portions or segments. For example, the difference in reactivity between monomer and comonomer may be such that if more of a less reactive component is added to the reaction, the length of the portions of copolymer decreases resulting in a gradient composition controlled by the difference in the reactivity between the monomer and comonomer and the rate with which each of the monomer and comonomer reacts.

The recycle ratio can also be used to control or otherwise adjust the length of copolymer portions or segments and the overall length (or molecular weight) of the gradient copolymer. Generally, a higher recycle ratio provides less residence time in individual heat exchangers and a lower overall residence time in the loop reaction, which results in shorter copolymer portions or segments and a lower molecular weight, respectively. Conversely, a lower recycle ratio provides more residence time in individual heat exchangers and a more overall residence time in the loop reaction, which results in longer copolymer portions or segments and a higher molecular weight, respectively.

Accordingly, the composition of the gradient copolymer (e.g., segment length, segment composition, overall molecular weight, gradient monomer weight percent in the copolymer, and gradient comonomer weight percent in the copolymer) can be controlled or otherwise adjusted by controlling or otherwise adjusting (a) the amount of monomer and/or comonomer in an injection feed and/or (b) the recycle ratio. As used herein, "gradient monomer (or comonomer) weight percent in the copolymer" refers to the difference between the wt % of monomer (or specific comonomer) in the highest wt % segment and lowest wt % segment relative to total monomer and comonomers weight in the respective segment. As used herein, the term "segment" relative to the gradient copolymer refers to the portion of the gradient copolymer synthesized in a single heat exchanger. The wt % of monomer for each segment may be different at each recycle ratio and may be a statistically averaged number for each segment. If the feed and recycle ratio are changed at the same time, the synergy between the two parameters may be represented by the statistically averaged number for the wt % of monomer in each segment.

The gradient copolymer produced from the methods described herein may have a number average molecular weight of about 25,000 g/mol to about 100,000 g/mol, or about 40,000 g/mol to about 95,000 g/mol, or about 60,000 g/mol to about 85,000 g/mol.

The gradient copolymer produced from the methods described herein may have a gradient monomer weight percent of about 3 wt % to about 30 wt %, or about 5 wt % to about 25 wt %, or about 5 wt % to about 20 wt %.

The gradient copolymer produced from the methods described herein may have a gradient comonomer weight percent for individual comonomers of about 3 wt % to about 30 wt %, or about 5 wt % to about 25 wt %, or about 5 wt % to about 20 wt %.

Segments of the gradient copolymer produced from the methods described herein may have a monomer content of about 50 wt % to about 100 wt %, or about 65 wt % to about 99 wt %, or about 75 wt % to about 95 wt %.

Segments of the gradient copolymer produced from the methods described herein may have a comonomer content for individual comonomers of 0 wt % to about 50 wt %, or about 1 wt % to about 35 wt %, or about 5 wt % to about 25 wt %.

Catalyst System

Catalyst systems suitable for use in conjunction with the method of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers and comonomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, New York, 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in a catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0 570 982 A, EP 0 520 732 A, EP 0 495 375 A, EP 0 500 944 B1, EP 0 277 003 A and EP 0 277 004 A; and U.S. Pat. Nos. 5,153,157, 5,198,401, 5,066,741, 5,206, 197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Monomers and Comonomers

Any monomer and comonomer having one or more (non-conjugated) aliphatic double bond(s) and two or more carbon atoms may be used. Examples of monomers and comonomers include, but are not limited to, α-olefins (e.g., ethylene, propylene, butene-1, hexene-1, octene-1, decene-1, and dodecene-1), substituted olefins (e.g., styrene, param-ethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomers or comonomers can be used. Advantageous monomers and comonomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. Monomers and comonomers can include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers and comonomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers and comonomers containing up to 30 carbon atoms can be used. Suitable aromatic-group-containing monomers and comonomers comprise at least one aromatic structure, advantageously from one to three, more advantageously a phenyl, indenyl, fluorenyl, or naphthyl moiety. The aromatic-group-containing monomers and comonomers further comprise at least one polymerizable double bond such that after polymerization, the aromatic structure will be pendant from the polymer backbone. The aromatic-group containing monomers and comonomers can further be substituted with one or more hydrocarbyl groups including but not limited to $C_1$ to $C_{10}$ alkyl groups. Additionally two adjacent substitutions can be joined to form a ring structure. Advantageous aromaticgroup-containing monomers and comonomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers and comonomers can be used. These monomers and comonomers can contain up to 30 carbon atoms. Suitable non-aromatic cyclic group containing monomers and comonomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers and comonomers include vinylcyclohexane, vinylcyclohexene, vinylnorbornene, ethylidene norbornene, cyclopentadiene, cyclopentene, cyclohexene, cyclobutene, vinyladamantad and the like.

Diolefin monomers and comonomers can be used. Advantageous diolefin monomers and comonomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers and comonomers (e.g., divinyl monomers and comonomers). More advantageously, the diolefin monomers and comonomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

EXAMPLE EMBODIMENTS

An example embodiment is a method comprising polymerizing a reaction mixture comprising a monomer and a comonomer in the presence of a metallocene catalyst in a loop reactor, wherein in the loop reactor a gradient monomer weight percent in the reaction mixture is about 3 wt % to about 50 wt %, thereby forming a gradient copolymer. Optionally this method can further include one or more of the following: Element 1: further comprising: injecting a first feed into the loop reactor at a feed injection point; and injecting a second feed into the loop reactor via an injection port that is downstream of the feed injection point, wherein the first feed and second feed have different weight ratios of monomer to comonomer; Element 2: wherein the weight ratio of monomer to comonomer in the first feed is about 1:1 to about 100:1, and wherein the weight ratio of monomer to comonomer in the second feed is about 1:0 to about 100:1; Element 3: wherein the weight ratio of monomer to comonomer in the first feed is about 10:1 to about 100:1, and wherein the weight ratio of monomer to comonomer in the second feed is about 1:0 to about 10:1; Element 4: wherein a recycle ratio of the loop reactor is about 0.01 to about 10; Element 5: wherein a recycle ratio of the loop reactor is about 0.01 to about 1; Element 6: wherein a recycle ratio of the loop reactor is about 1 to about 10; Element 7: wherein the gradient monomer weight percent in the reaction mixture is about 5 wt % to about 25 wt %.; Element 8: wherein the polymerizing is a slurry polymerization process performed at 15 psi to 735 psi and 0° C. to about 120° C.; Element 9: wherein the polymerizing is a solution polymerization process performed at 120 psi to 1800 psi and 50° C. to 220° C.; Element 10: wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 11: wherein the comonomer is different than the monomer and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 12: wherein the gradient copolymer has a number average molecular weight of about 25,000 g/mol to about 100,000 g/mol; Element 13: wherein the gradient copolymer has a gradient monomer weight percent of about 3 wt % to about 30 wt %.; Element 14: wherein the gradient copolymer has a gradient comonomer weight percent for individual comonomers of about 3 wt % to about 30 wt %; Element 15: wherein the gradient copolymer has segments with a monomer content of about 50 wt % to about 100 wt %; Element 16: wherein the gradient copolymer has segments with a comonomer content for individual comonomers of 0 wt % to about 50 wt %. Examples of combinations of the foregoing include, but are not limited to, Element 1 in combination with one or more of Elements 2-3 and optionally in further combination with one or more of Elements 4-5; Element 1 in combination with one or more of Elements 2-3 in further combination with Elements 4 and 6; Element 1 in combination with one or more of Elements 4-5 in further combination with one or more of Elements 7-16; Element 1 in combination with Elements 2 and 4; Element 1 in combination with Elements 3 and 4 optionally in further combination with two or more of Elements 6-16; Element 1 in combination with Elements 3 and 5 optionally in further combination with two or more of Elements 7-16; Element 1 in combination with two or more of Elements 7-16; Element 4 optionally in further combination with one or more of Elements 7-16; Element 5 in further combination with one or more of Elements 7-16; and Element 6 in further combination with one or more of Elements 7-16.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While methods are described herein in terms of "comprising" various components or steps, the methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A polymerization reaction producing a gradient copolymer was simulated with a loop reactor including two injection ports set up in the model as shown in the FIGURE. The simulation software used was Aspen Plus version 9.0 with the Aspen Polymer Module. The thermodynamic method was based on Perturbed-Chain Statistical Association Fluid Theory (PC-SAFT). The required material properties were directly obtained from the property data banks implemented in Aspen Plus. Plug Flow Reactor module was used to simulate the heat exchangers in the loop reactor. The ranges of temperature, pressure, monomer and comonomer concentrations, etc. were designed based on an industrial scale solution polymerization process.

The polymerization reaction simulated in Example 1 was the copolymerization of ethylene (C2) and propylene (C3). Propylene was the monomer, and ethylene was the comonomer. Copolymerization kinetics were obtained from the literature and implemented in the simulator. Therefore, both heat and mass balance and polymer properties, including chemical composition and molecular weight distribution can be accurately modeled. A metallocene catalyst was used in the catalyst system. The weight fraction ratio of propylene monomer:ethylene comonomer:solvent in the feed was set to be 34.7%:4.4%:60.9%. The feed temperature was 25° C.

Ten cases were modeled in Example 1. In this example, propylene monomer is injected in the loop reactor via a single injection port. In cases 1-5, the propylene monomer is injected via the injection port located between heat exchangers 108 and 109 (Injection 2). In cases 6-10, the propylene monomer is injected via the injection port located between the reactor outlet 115 and heat exchanger 106 (Injection 1). In this example, the recycle ratio remains unchanged at 0.5. The amount of propylene added in either injection port is measured based on the ratio of the propylene flow rate in the injection port to the ethylene flow rate in the feed (C3 in injection 1 or 2 over C2 in feed ratio). Table 1 shows these propylene amounts, the recycle ratio, and the number average molecular weight for the resulting polymer in each of cases 1-10. Table 2 shows the corresponding average comonomer content of polymer segments obtained after heat exchangers 101, 104, 106, 108, and 110 and the average comonomer content ratio between the segment obtained after heat exchanger 101 and the segment obtained after heat exchanger 110. Table 3 shows the corresponding average length fraction of polymer segments obtained after heat exchangers 101, 104, 106, 108, and 110 and the average length fraction ratio between the segment obtained after heat exchanger 101 and the segment obtained after heat exchanger 110.

TABLE 1

| Case No. | Weight Ratio of C3 in Injection 1 to C2 in Feed | Weight Ratio of C3 in Injection 2 to C2 in Feed | Recycle Ratio | Number Average MW (g/mol) |
| --- | --- | --- | --- | --- |
| 1 | 0.0 | 1.0 | 0.5 | 71980 |
| 2 | 0.0 | 2.0 | 0.5 | 72784 |
| 3 | 0.0 | 3.0 | 0.5 | 73433 |
| 4 | 0.0 | 4.0 | 0.5 | 73921 |
| 5 | 0.0 | 5.0 | 0.5 | 74302 |
| 6 | 1.0 | 0.0 | 0.5 | 72476 |
| 7 | 2.0 | 0.0 | 0.5 | 73601 |
| 8 | 3.0 | 0.0 | 0.5 | 74460 |
| 9 | 4.0 | 0.0 | 0.5 | 75065 |
| 10 | 5.0 | 0.0 | 0.5 | 75512 |

TABLE 2

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
| --- | --- | --- | --- | --- | --- | --- |
| 1 | 22.84 | 17.57 | 13.35 | 7.55 | 3.33 | 19.51 |
| 2 | 21.36 | 16.64 | 12.85 | 7.51 | 2.98 | 18.38 |

TABLE 2-continued

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
|---|---|---|---|---|---|---|
| 3 | 19.99 | 15.81 | 12.41 | 7.52 | 2.71 | 17.28 |
| 4 | 18.77 | 15.06 | 12.01 | 7.52 | 2.70 | 16.07 |
| 5 | 17.69 | 14.38 | 11.64 | 7.50 | 2.59 | 15.1 |
| 6 | 23.21 | 17.78 | 10.75 | 6.55 | 4.05 | 19.16 |
| 7 | 21.95 | 16.99 | 9.03 | 6.03 | 4.02 | 17.93 |
| 8 | 20.65 | 16.21 | 7.94 | 5.71 | 4.13 | 16.52 |
| 9 | 19.45 | 15.49 | 7.21 | 5.50 | 4.18 | 15.27 |
| 10 | 18.37 | 14.84 | 6.68 | 5.32 | 4.21 | 14.16 |

TABLE 3

| Case No. | Average Length Fraction of 101 Segment (%) | Average Length Fraction of 104 Segment (%) | Average Length Fraction of 106 Segment (%) | Average Length Fraction of 108 Segment (%) | Average Length Fraction of 110 Segment (%) | Average Length Fraction Ratio of 101/110 |
|---|---|---|---|---|---|---|
| 1 | 18.57 | 12.64 | 9.06 | 4.23 | 3.46 | 5.37 |
| 2 | 17.46 | 12.39 | 9.19 | 4.63 | 4.38 | 3.98 |
| 3 | 16.59 | 12.23 | 9.35 | 5.07 | 4.91 | 3.38 |
| 4 | 15.92 | 12.12 | 9.52 | 5.49 | 5.20 | 3.06 |
| 5 | 15.35 | 12.05 | 9.69 | 5.90 | 5.36 | 2.86 |
| 6 | 18.20 | 12.23 | 9.37 | 5.26 | 3.25 | 5.61 |
| 7 | 16.99 | 11.83 | 9.35 | 6.09 | 4.24 | 4.01 |
| 8 | 16.15 | 11.69 | 9.16 | 6.58 | 4.98 | 3.24 |
| 9 | 15.60 | 11.70 | 8.92 | 6.83 | 5.45 | 2.86 |
| 10 | 15.22 | 11.79 | 8.66 | 6.93 | 5.79 | 2.63 |

This example illustrates that the gradient copolymer obtained when additional monomer is injected via the injection port located between heat exchangers 108 and 109 has a steeper comonomer gradient, corresponding to a higher comonomer content at the beginning of the segment and lower comonomer content at the end. It leads to a stiffer hard segment and flexible soft segment. Therefore, by injecting monomer in one location of the loop, the comonomer gradient in the gradient copolymer can be significantly adjusted. The simulation being based on live polymerization kinetics, there may be some error rate accumulation making some values slightly outside the curve as in the average monomer content of the 108 segment in cases 3 and 4.

Example 2. Example 2 uses the same simulation conditions as Example 1, except that in Example 2, propylene monomer is injected in the loop reactor via two injection ports. Ten cases were modeled in Example 2. In cases 11-20, the propylene monomer is injected via the injection port located between the reactor outlet 115 and heat exchanger 106 and the injection port located between heat exchangers 108 and 109. Again, in this example, the recycle ratio remains unchanged at 0.5. The amount of propylene added in the injection ports is measured based on the ratio of the propylene flow rate in the injection port to the ethylene flow rate in the feed. Table 4 shows these propylene amounts, the recycle ratio, and the number average molecular weight for the resulting polymer in each of cases 11-20. Table 5 shows the corresponding average comonomer content of polymer segments obtained after heat exchangers 101, 104, 106, 108, and 110 and the average comonomer content ratio between the segment obtained after heat exchanger 101 and the segment obtained after heat exchanger 110. Table 6 shows the corresponding average length fraction of polymer segments obtained after heat exchangers 101, 104, 106, 108, and 110 and the average length fraction ratio between the segment obtained after heat exchanger 101 and the segment obtained after heat exchanger 110.

TABLE 4

| Case No. | Weight Ratio of C3 in Injection 1 to C2 in Feed | Weight Ratio of C3 in Injection 2 to C2 in Feed | Recycle Ratio | Number Average MW (g/mol) |
|---|---|---|---|---|
| 11 | 1.0 | 1.0 | 0.5 | 73240 |
| 12 | 1.0 | 5.0 | 0.5 | 74895 |
| 13 | 2.0 | 1.0 | 0.5 | 74160 |
| 14 | 2.0 | 5.0 | 0.5 | 75326 |
| 15 | 3.0 | 1.0 | 0.5 | 74862 |
| 16 | 3.0 | 5.0 | 0.5 | 75632 |
| 17 | 4.0 | 1.0 | 0.5 | 75336 |
| 18 | 4.0 | 5.0 | 0.5 | 75842 |
| 19 | 5.0 | 1.0 | 0.5 | 75691 |
| 20 | 5.0 | 5.0 | 0.5 | 75971 |

TABLE 5

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
|---|---|---|---|---|---|---|
| 11 | 21.73 | 16.87 | 10.61 | 6.67 | 3.49 | 18.24 |
| 12 | 16.94 | 13.93 | 9.95 | 6.95 | 2.90 | 14.04 |
| 13 | 20.54 | 16.14 | 9.00 | 6.16 | 3.65 | 16.89 |
| 14 | 16.20 | 13.47 | 8.79 | 6.56 | 3.18 | 13.02 |
| 15 | 19.39 | 15.45 | 7.99 | 5.85 | 3.82 | 15.57 |

TABLE 5-continued

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
|---|---|---|---|---|---|---|
| 16 | 15.51 | 13.04 | 7.97 | 6.25 | 3.44 | 12.07 |
| 17 | 18.34 | 14.83 | 7.28 | 5.63 | 3.93 | 14.41 |
| 18 | 14.87 | 12.63 | 7.35 | 5.99 | 3.54 | 11.33 |
| 19 | 17.38 | 14.23 | 6.75 | 5.43 | 4.03 | 13.35 |
| 20 | 14.29 | 12.26 | 6.86 | 5.76 | 3.60 | 10.69 |

TABLE 6

| Case No. | Average Length Fraction of 101 Segment (%) | Average Length Fraction of 104 Segment (%) | Average Length Fraction of 106 Segment (%) | Average Length Fraction of 108 Segment (%) | Average Length Fraction of 110 Segment (%) | Average Length Fraction Ratio of 101/110 |
|---|---|---|---|---|---|---|
| 11 | 17.20 | 12.05 | 9.35 | 5.49 | 4.26 | 4.03 |
| 12 | 14.81 | 11.88 | 9.67 | 6.68 | 5.47 | 2.71 |
| 13 | 16.23 | 11.79 | 9.32 | 6.27 | 4.89 | 3.32 |
| 14 | 14.44 | 11.85 | 9.53 | 7.16 | 5.57 | 2.59 |
| 15 | 15.61 | 11.72 | 9.15 | 6.70 | 5.36 | 2.91 |
| 16 | 14.21 | 11.90 | 9.31 | 7.40 | 5.69 | 2.50 |
| 17 | 15.18 | 11.77 | 8.92 | 6.94 | 5.66 | 2.68 |
| 18 | 14.07 | 12.00 | 9.08 | 7.51 | 5.73 | 2.45 |
| 19 | 14.89 | 11.87 | 8.67 | 7.03 | 5.88 | 2.53 |
| 20 | 13.98 | 12.13 | 8.85 | 7.53 | 5.77 | 2.42 |

This example illustrates that adding monomer via dual injection ports provides more flexibility to fine-tune the comonomer gradient throughout the gradient copolymer, making the gradient in comonomer content between segments of the gradient copolymer smoother. Example 3. Example 3 uses the same simulation conditions as Example 1, except that in Example 3, the recycle ratio varies and propylene monomer is injected in the loop reactor via the first, second or both injection ports in a fixed amount. Fifteen cases were modeled in Example 3. In cases 21-25, the propylene monomer is injected via the injection port located between heat exchangers 108 and 109. In cases 26-30, the propylene monomer is injected via the injection port located between the reactor outlet 115 and heat exchanger 106. In cases 31-35, the propylene monomer is injected via both injection ports. The amount of propylene added in either injection port is measured based on the ratio of the propylene flow rate in the injection port to the ethylene flow rate in the feed. Table 7 shows these propylene amounts, the recycle ratio, and the number average molecular weight for the resulting polymer in each of cases 21-35. Table 8 shows the corresponding average comonomer content of polymer segments obtained after heat exchangers 101, 104, 106, 108, and 110 and the average comonomer content ratio between the segment obtained after heat exchanger 101 and the segment obtained after heat exchanger 110. Table 9 shows the corresponding average length fraction of polymer segments obtained after heat exchangers 101, 104, 106, 108, and 110 and the average length fraction ratio between the segment obtained after heat exchanger 101 and the segment obtained after heat exchanger 110.

TABLE 7

| Case No. | Weight Ratio of C3 in Injection 1 to C2 in Feed | Weight Ratio of C3 in Injection 2 to C2 in Feed | Recycle Ratio | Number Average MW (g/mol) |
|---|---|---|---|---|
| 21 | 0 | 5 | 3 | 72037 |
| 22 | 0 | 5 | 1 | 72250 |
| 23 | 0 | 5 | 0.5 | 72650 |
| 24 | 0 | 5 | 0.25 | 73576 |
| 25 | 0 | 5 | 0.05 | 78174 |
| 26 | 5 | 0 | 3 | 72174 |
| 27 | 5 | 0 | 1 | 72664 |
| 28 | 5 | 0 | 0.5 | 73410 |
| 29 | 5 | 0 | 0.25 | 74754 |
| 30 | 5 | 0 | 0.05 | 79236 |
| 31 | 5 | 5 | 3 | 73220 |
| 32 | 5 | 5 | 1 | 73684 |
| 33 | 5 | 5 | 0.5 | 74323 |
| 34 | 5 | 5 | 0.25 | 75527 |
| 35 | 5 | 5 | 0.05 | 79406 |

TABLE 8

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
|---|---|---|---|---|---|---|
| 21 | 17.11 | 15.49 | 14.44 | 13.26 | 11.60 | 5.51 |
| 22 | 19.79 | 16.36 | 13.89 | 10.63 | 6.43 | 13.36 |
| 23 | 21.66 | 16.84 | 12.97 | 7.52 | 2.93 | 18.73 |

TABLE 8-continued

| Case No. | Average C2 Content of 101 Segment (wt %) | Average C2 Content of 104 Segment (wt %) | Average C2 Content of 106 Segment (wt %) | Average C2 Content of 108 Segment (wt %) | Average C2 Content of 110 Segment (wt %) | Gradient C2 Content (101-110) (wt %) |
|---|---|---|---|---|---|---|
| 24 | 22.97 | 16.95 | 11.24 | 3.80 | 0.94 | 22.03 |
| 25 | 23.01 | 16.12 | 5.83 | 0.50 | 0.35 | 22.66 |
| 26 | 17.27 | 15.63 | 13.55 | 12.47 | 11.29 | 5.98 |
| 27 | 20.15 | 16.62 | 11.55 | 9.12 | 7.17 | 12.98 |
| 28 | 22.19 | 17.15 | 9.31 | 6.12 | 4.03 | 18.16 |
| 29 | 23.77 | 17.34 | 6.68 | 3.46 | 1.88 | 21.89 |
| 30 | 24.54 | 16.62 | 2.39 | 1.04 | 0.60 | 23.94 |
| 31 | 15.49 | 14.16 | 12.54 | 11.64 | 10.06 | 5.43 |
| 32 | 17.94 | 15.10 | 11.05 | 8.95 | 6.23 | 11.71 |
| 33 | 19.72 | 15.64 | 9.23 | 6.32 | 3.49 | 16.23 |
| 34 | 21.14 | 15.94 | 6.94 | 3.82 | 1.60 | 19.54 |
| 35 | 21.83 | 15.50 | 2.65 | 1.22 | 0.47 | 21.36 |

TABLE 9

| Case No. | Average Length Fraction of 101 Segment (%) | Average Length Fraction of 104 Segment (%) | Average Length Fraction of 106 Segment (%) | Average Length Fraction of 108 Segment (%) | Average Length Fraction of 110 Segment (%) | Average Length Fraction Ratio of 101/110 |
|---|---|---|---|---|---|---|
| 21 | 12.35 | 10.70 | 9.78 | 8.59 | 7.86 | 1.57 |
| 22 | 15.32 | 11.64 | 9.51 | 6.51 | 5.57 | 2.75 |
| 23 | 17.68 | 12.43 | 9.16 | 4.55 | 4.22 | 4.18 |
| 24 | 19.81 | 13.26 | 8.55 | 2.53 | 3.28 | 6.05 |
| 25 | 23.80 | 15.44 | 5.63 | 0.17 | 0.51 | 46.49 |
| 26 | 12.31 | 10.65 | 9.86 | 8.73 | 7.82 | 1.57 |
| 27 | 15.10 | 11.40 | 9.63 | 7.14 | 5.53 | 2.73 |
| 28 | 17.19 | 11.88 | 9.37 | 5.96 | 4.08 | 4.22 |
| 29 | 19.03 | 12.28 | 8.94 | 4.95 | 3.01 | 6.32 |
| 30 | 22.69 | 13.48 | 5.96 | 3.01 | 1.59 | 14.27 |
| 31 | 11.86 | 10.57 | 9.86 | 8.93 | 8.22 | 1.44 |
| 32 | 14.13 | 11.27 | 9.63 | 7.48 | 6.37 | 2.22 |
| 33 | 15.91 | 11.81 | 9.36 | 6.30 | 5.10 | 3.12 |
| 34 | 17.57 | 12.38 | 8.92 | 5.21 | 4.01 | 4.38 |
| 35 | 21.28 | 14.24 | 6.04 | 3.12 | 1.53 | 13.89 |

This example illustrates how a low recycle ratio results in a very steep comonomer gradient in the gradient copolymer. In particular, in case 5, the polymer starts with a segment with an average comonomer content as high as 23.01% and ends with a chemical composition close to neat propylene, with an average comonomer content ratio between the segment obtained after heat exchanger 101 and the segment obtained after heat exchanger 110 as high as 66.58. At high recycle ratio, the comonomer gradient is less steep as the residence time is so short for the active site to stay in one heat exchanger.

These examples illustrate that the comonomer gradient in a gradient copolymer can be effectively controlled by varying the monomer and comonomer flow rate in the injection port(s) and the recycle ratio in a loop reactor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While the methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   polymerizing a reaction mixture comprising a monomer and a comonomer in the presence of a metallocene catalyst in a loop reactor, wherein in the loop reactor a gradient monomer weight percent in the reaction mixture is about 3 wt % to about 50 wt %, thereby forming a gradient copolymer, and a recycle ratio of the loop reactor is about 1 to about 10.

2. The method of claim 1 further comprising:
   injecting a first feed into the loop reactor at a feed injection point; and injecting a second feed into the loop reactor via an injection port that is downstream of the feed injection point, wherein the first feed and second feed have different weight ratios of monomer to comonomer.

3. The method of claim 2, wherein the weight ratio of monomer to comonomer in the first feed is about 10:1 to about 100:1, and wherein the weight ratio of monomer to comonomer in the second feed is about 1:0 to about 10:1.

4. The method of claim 1, wherein the gradient monomer weight percent in the reaction mixture is about 5 wt % to about 25 wt %.

5. The method of claim 1, wherein the polymerizing is a slurry polymerization process performed at 15 psi to 735 psi and 0° C. to about 120° C.

6. The method of claim 1, wherein the polymerizing is a solution polymerization process performed at 120 psi to 1800 psi and 50° C. to 220° C.

7. The method of claim 1, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

8. The method of claim 1, wherein the comonomer is different than the monomer and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

9. The method of claim 1, wherein the gradient copolymer has a number average molecular weight of about 25,000 g/mol to about 100,000 g/mol.

10. The method of claim 1, wherein the gradient copolymer has a gradient monomer weight percent of about 3 wt % to about 30 wt %.

11. The method of claim 1, wherein the gradient copolymer has a gradient comonomer weight percent for individual comonomers of about 3 wt % to about 30 wt %.

12. The method of claim 1, wherein the gradient copolymer has segments with a monomer content of about 50 wt % to about 100 wt %.

13. The method of claim 1, wherein the gradient copolymer has segments with a comonomer content for individual comonomers of 0 wt % to about 50 wt %.

14. A method for making gradient copolymers in a loop reactor, comprising:
    injecting a first feed into a loop reactor at a feed injection point;
    injecting a second feed into the loop reactor via an injection port that is downstream of the feed injection point, wherein the first feed and second feed have different weight ratios of monomer to comonomer; and
    polymerizing a reaction mixture comprising the monomer and the comonomer in the presence of a metallocene catalyst in the loop reactor,
    wherein a gradient monomer weight percent in the reaction mixture is about 3 wt % to about 50 wt %, thereby forming a gradient copolymer, a recycle ratio of the loop reactor is about 0.01 to about 10, and the weight ratio of monomer to comonomer in the first feed is about 1:1 to about 100:1, and wherein the weight ratio of monomer to comonomer in the second feed is about 1:0 to about 100:1.

15. The method of claim 14, wherein the weight ratio of monomer to comonomer in the first feed is about 10:1 to about 100:1, and wherein the weight ratio of monomer to comonomer in the second feed is about 1:0 to about 10:1.

16. The method of claim 14, wherein the recycle ratio of the loop reactor is about 0.01 to about 1.

17. The method of claim 14, wherein the gradient monomer weight percent in the reaction mixture is about 5 wt % to about 25 wt %.

18. The method of claim 14, wherein the polymerizing is a slurry polymerization process performed at 15 psi to 735 psi and 0° C. to about 120° C.

19. The method of claim 14, wherein the polymerizing is a solution polymerization process performed at 120 psi to 1800 psi and 50° C. to 220° C.

* * * * *